3,754,084
STABILIZED COMPOSITION FOR POULTRY AND LIVESTOCK CONTAINING A VITAMIN B$_2$ COMPOUND AND A MACROLIDE ANTIBIOTIC
Kuniyoshi Fujie, Takatsuki, Sadao Kondo and Kazuo Hara, Kawanishi, Yoshihiro Okada, Toyonaka, and Yoshitatsu Hayashi, Suita, Japan, assignors to Takeda Chemical Industries, Ltd., Osaka, Japan
No Drawing. Filed Sept. 30, 1971, Ser. No. 185,368
Claims priority, application Japan, Oct. 26, 1970, 45/94,525
Int. Cl. A61k 21/00, 27/00
U.S. Cl. 424—181
13 Claims

ABSTRACT OF THE DISCLOSURE

A composition for poultry and livestock comprising a vitamin B$_2$ compound such as vitamin B$_2$, a macrolide antibiotic such as tylosin and a phenol compound such as salicyclic acid, which composition is stable even in aqueous solution.

---

This invention relates to a composition for poultry and livestock, the composition being stable even in the state of its aqueous solution. The composition comprises at least one of the macrolide antibiotics, one of the vitamin B$_2$ compounds and a phenol compound represented by the general formula:

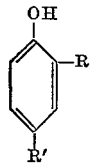

wherein R means hydrogen atom, methoxy or carboxy radical; R' means hydrogen atom, hydroxy, formyl or carboxy radical.

In recent years, animal drugs containing vitamins or antibiotics, etc., have been developed for the purpose of growth promotion, heightening of egg production rate and hatching rate or the prophylaxis and cure of diseases in poultry and livestock. In view of a large-scale production in animal husbandry, these drugs have been advantageously employed in the form of an aqueous solution which is fed as drinking water, etc.

However, it was revealed that, in an aqueous solution containing macrolide antibiotics and vitamin B$_2$ compounds, the former is liable to be decomposed when the aqueous solution is exposed to light, e.g. sun-light. That is to say, the macrolide antibiotics are remarkably decomposed when the solution is allowed to stand for a day in the shade in the open air, in combination with the vitamin B$_2$ compounds in the solution, while the content of the macrolide antibiotics is nearly the same as the initial content when the solution containing macrolide antibiotics alone is exposed even to sun-light in the open air for a day. For example, when the solution containing 80 μg. of tylosin and 4 μg. of vitamin B$_2$ is allowed to stand for three hours in the shade in the open air, more than 90% of the tylosin is decomposed.

The present inventors conducted an extensive research in order to circumvent the foregoing disadvantage and have ultimately discovered that the macrolide antibiotics coexisting with vitamin B$_2$ compounds in an aqueous solution are stabilized against the light by adding a phenol compound of the Formula I. The present invention is based on this finding.

The principal object of the present invention is to provide a composition for poultry and livestock, being stable even in the state of its aqueous solution, which comprises at least one of the macrolide antibiotics, one of vitamin B$_2$ compounds and a phenol compound (I).

Another object is to provide a method for stabilizing water-soluble composition for the poultry and livestock containing at least one of the macrolide antibiotics and one of vitamin B$_2$ compounds by adding a phenol compound (I) to the composition.

Other objects will become apparent from the detailed description hereinafter provided.

In this specification as well as in the appended claims, "macrolide antibiotics" means the antibiotics containing a large lactone ring, being acceptable to poultry and livestock. Among them, preferable ones are exemplified by tylosin, oleandomycin, leucomycin and spiramycin or an organic acid salt thereof (e.g. a salt with adipic acid, tartaric acid or lactobionic acid) or an inorganic acid salt thereof (e.g. a salt with meta-phosphoric acid, phosphoric acid, hydrochloric acid, or sulfuric acid).

The vitamin B$_2$ compounds mean vitamin B$_2$ and its derivatives, e.g. flavin mono-nucleotide and flavin adenine dinucleotide, etc.

As the phenol compound (I), there may be employed, for example, salicylic acid, 2,5-dihydroxybenzoic acid, catechol, protocatechuic acid, vanillin or a salt thereof with e.g. sodium or potassium.

The phenol compound (I) is mixed with vitamin B$_2$ compounds and macrolide antibiotics, and the mixture may further be prepared into such a form as tablet, granule or the like. If desired, these preparations may further contain a suitable non-toxic and water-soluble solid carrier (e.g. glucose, fructose, cane sugar and lactose, etc.) or a suitable non-toxic liquid and water-miscible carrier (e.g. water, and ethanol, etc.). Though the suitable proportion of phenol compound (I) to be added generally falls within the range from about 0.5 to about 20 parts by weight, more preferably, from about 2 to about 10 parts by weight relative to one part by weight of vitamin B$_2$ compounds, the above range may vary somewhat with the kind of vitamin B$_2$ compounds and phenol compound (I) or the manner of practical administration. The macrolide antibiotics are, generally, used from about 1 to about 200 parts by weight, more preferably, from about 5 to 100 parts by weight, relative to one part by weight of vitamin B$_2$ compounds, but those amounts have substantially nothing to do with the amount of the phenol compound (I) to be added. The thus prepared water-soluble composition is usually dissolved in water and the aqueous solution may be administered to poultry or livestock as a drinking water. Alternatively, the water soluble composition or its aqueous solution may be added to a feed for poultry or livestock. Suitable concentration of macrolide antibiotics is about 0.00001 to about 0.1% when the composition is admixed with a drinking water. When the composition is admixed with feeds, the concentration of the macrolide antibiotics is preferably in the range of 0.00002 to 0.2%.

The present water-soluble composition may further contain such compounds as do not decrease the stability of the present composition, for example, active vitamin B$_1$ derivatives such as thiamine propyldisulfide, thiamine tetrahydrofurfuryl disulfide, thiamino-8-(methyl-6-acetyldihydrothioctate)disulfide, benzoylthiamine monophosphate, benzoylthiamine disulfide, o-butyrylthiamine disulfide, nicotinic acid amide, calcium pantothenate and dioxycarbonylthiamine, vitamin B$_6$ compounds such as pyridoxine, vitamin C, vitamin K$_4$, vitamin A, vitamin D$_3$, vitamin E, folic acid, α-amino acids such as methionine and lysine, etc., sulfa-drugs such as sulfadimethoxine, sulfamethazine, sulfisozole, sulfapyridazine, sulfathiazole, sulfisomezole, sulfadiazine, sulfamonomethoxine, sulfamerazine and sulfisoxazol, edible pigments such as Brilliant Blue FCF, Fast Green FCF, Acid Violet 6B, Tartrazine, Sunset Yellow FCF, Erythrosine and Ponceau SX, and tetracyclines such as tetracycline, chlortetracycline, demethylchlortetracycline, oxytetracycline, demethyltetracycline, methacycline, doxycycline and minocycline, etc.

For the purpose of giving those skilled in the art a better understanding of the invention, the following illustrative tests and examples are given. In the formulations of the following tests "part(s) by weight" bears the same relation to part(s) by volume as does gram(s) to milliliter(s) and percent (%) is shown on weight basis.

Test 1

(1) Test composition: A mixture of 5.0 parts by weight of tylosin tartarate, 0.5 part by weight of vitamin $B_2$, 5.0 parts by weight of variable phenol compound (I) and 89.5 parts by weight of glucose.

(2) Control composition: A mixture of 5.0 parts by weight of tylosin tartarate, 0.5 part by weight of vitamin $B_2$ and 94.5 parts by weight of glucose.

(3) Procedure: Various phenol compounds (I) are tested for their stabilizing effect by the following procedure. Each composition is dissolved in water so as to make its concentration 0.2%. 100 parts by volume of each solution is allowed to stand for three hours in the shade in the open air. The residual percent of tylosin tartarate in respective tests hereinafter is calculated on the basis of the results of bioassay employing *Sarcina lutea* (ATCC 9341) in terms of tylosin tartarate.

(4) Results:

TABLE I

| Phenol compound (I): | Residual percent of tylosin tartarate after 3 hours |
|---|---|
| (Control) | 3 |
| 2,5-dihydroxybenzoic acid | 100 |
| Salicylic acid | 98 |
| Vanillin | 94 |
| Protocatechuic acid | 90 |
| p-Hydroxybenzoic acid | 88 |
| Catechol | 88 |

Test 2

(1) Test composition: A mixture of 5.0 parts by weight of spiramycin sulfate, 0.5 part by weight of vitamin $B_2$, 5.0 parts by weight of variable phenol compound (I) and 89.5 parts by weight of lactose.

(2) Control composition: A mixture of 5.0 parts by weight of spiramycin sulfate, 0.5 part by weight of vitamin $B_2$ and 94.5 parts by weight of lactose.

(3) Procedure: Various phenol compounds (I) are tested in the same manner as Test 1, except for the use of spiramycin sulfate instead of tylosin.

(4) Result:

TABLE II

| Phenol compound (I): | Residual percent of spiramycin sulfate after 3 hours |
|---|---|
| (Control) | 4 |
| 2,5-dihydroxybenzoic acid | 69 |
| Salicylic acid | 76 |
| Vanillin | 75 |
| p-Hydroxybenzoic acid | 70 |

Test 3

(1) Test composition: A mixture of 5.0 parts by weight of leucomycin tartarate, 0.5 part by weight of vitamin $B_2$, 5.0 parts by weight of variabe phenol compound (I) and 94.5 parts by weight of lactose.

(2) Control composition: A mixture of 5.0 parts by weight of leucomycin tartarate, 0.5 part by weight of vitamin $B_2$ and 94.5 parts by weight of lactose.

(3) Procedure: Various phenol compounds (I) are tested in the same manner as Test 1, except for the use of leucomycin tartarate instead of tylosin tartarate.

(4) Result:

TABLE III

| Phenol compound (I): | Residual percent of leucomycin tartarate after 3 hours |
|---|---|
| (Control) | 4 |
| 2,5-dihydroxybenzoic acid | 69 |
| Salicylic acid | 60 |
| Vanillin | 69 |
| Catechol | 65 |

Test 4

(1) Test composition: A mixture of 5.0 parts by weight of tylosin tartarate, 1.0 part by weight of flavin mononucleotide, 5.0 parts by weight of variable phenol compound (I) and 89.0 parts by weight of lactose.

(2) Control composition: A mixture of 5.0 parts by weight of tylosin tartarate, 1.0 part by weight of flavin mononucleotide and 94.0 parts by weight of lactose.

(3) Procedure: Various phenol compounds (I) are tested in the same manner as Test 1.

(4) Result:

TABLE IV

| Phenol compound (I): | Residual percent of tylosin tartarate after 3 hours |
|---|---|
| (Control) | 5 |
| 2,5-dihydroxybenzoic acid | 100 |
| Salicylic acid | 99 |
| Vanillin | 96 |

EXAMPLE 1

Powder (in 1000 g.):

| Tylosin tartarate | g | 100 |
|---|---|---|
| Vitamin A | IU | 2,400,000 |
| Vitamin $D_3$ | IU | 300,000 |
| Vitamin $B_1$ hydrochloride | g | 1.6 |
| Vitamin $B_2$ | g | 3.2 |
| Vitamin $B_6$ | g | 1.92 |
| Vitamin $B_{12}$ | g | 0.012 |
| Vitamin E | g | 0.6 |
| Nicotinic acid amide | g | 19.2 |
| Calcium pantothenate | g | 12 |
| Folic acid | g | 0.48 |
| 2,5-dihydroxybenzoic acid | g | 30 |
| Lactose, added to make 1000 g. | | |

The above formulation is dissolved in water to make the concentration of tylosin tartarate 0.005 percent. The solution is given to poultry or livestock as drinking water.

EXAMPLE 2

Powder (in 1000 g.):

| Tylosin tartarate | g | 125 |
|---|---|---|
| Sulfisozole | g | 375 |
| Vitamin A | IU | 2,500,000 |
| Vitamin $D_3$ | IU | 500,000 |
| Vitamin E | g | 2.5 |
| Vitamin $B_1$ | g | 1.25 |
| Vitamin $B_2$ | g | 2.5 |
| Vitamin $B_6$ | g | 1.25 |
| Vitamin $B_{12}$ | g | 0.005 |
| Vitamin $K_3$ | g | 1.25 |
| Nicontinic acid amide | g | 20 |
| Calcium pantothenate | g | 15 |
| Folic acid | g | 0.5 |
| 2,5-dihydrobenzoic acid | g | 25 |
| Glucose, added to make 1000 g. | | |

The above formulation is dissolved in water to make the concentration of tylosin tartarate 0.01 percent. The solution is given to poultry or livestock as drinking water.

What is claimed is:

1. A composition for poultry and livestock, being stable in aqueous solution, which comprises 1 part by weight of a vitamin $B_2$ compound selected from the group consisting of vitamin $B_2$, flavin mononucleotide and flavin adenine dinucleotide, 1–200 total parts by weight of at least one macrolide antibiotic selected from the group consisting of tylosin, oleandomycin, spiramycin, leucomycin and their salts and 0.5–20 parts by weight of a phenol compound selected from the group consisting of salicylic acid, 2,5-dihydroxybenzoic acid, p-hydroxybenzoic acid, catechol, protocatechuic acid, vanillin and their salts.

2. A composition claimed in claim 1, containing 1 part by weight of the vitamin $B_2$ compound, 5–100 parts by weight of the macrolide antibiotic and 2–10 parts by weight of the phenol compound.

3. A composition claimed in claim 1, wherein the phenol compound is 2,5-dihydroxybenzoic acid.

4. A composition claimed in claim 1, wherein the phenol compound is salicylic acid.

5. A composition claimed in claim 1, wherein the phenol compound is vanillin.

6. A composition claimed in claim 1, wherein tylosin is employed as the macrolide antibiotic.

7. A composition claimed in claim 1, wherein spiramycin is employed as the macrolide antibiotic.

8. A composition claimed in claim 1, wherein leucomycin is employed as the macrolide antibiotic.

9. A method for preparing a water-soluble composition for poultry and livestock which comprises adding 0.5–20 parts by weight of a phenol compound selected from the group consisting of salicylic acid, 2,5-dihydroxybenzoic acid, p-hydroxybenzoic acid, catechol, protocatechuic acid, vanillin and their salts to a composition containing one part by weight of a vitamin $B_2$ compound selected from the group consisting of vitamin $B_2$, flavin mononucleotide and flavin adenine dinucleotide and 1–200 total parts by weight of at least one macrolide antibiotic selected from the group consisting of tylosin, oleandomycin, spiramycin, leucomycin and their salts.

10. A method claimed in claim 9, wherein 2–10 parts by weight of the phenol compound are added to the composition containing one part by weight of the vitamin $B_2$ compound and 5–100 parts by weight of the macrolide antibiotic.

11. A method for preparing water-soluble composition claimed in claim 9, wherein the phenol compound is 2,5-dihydroxybenzoic acid.

12. A method claimed in claim 9, wherein the phenol compound is salicylic acid.

13. A method claimed in claim 9, wherein the phenol compound is vanillin.

References Cited

UNITED STATES PATENTS

| | | | |
|---|---|---|---|
| 2,657,171 | 10/1953 | Macek et al. | 260—210 S |
| 3,022,219 | 2/1962 | Celmer | 260—210 AB |

FOREIGN PATENTS

| | | | |
|---|---|---|---|
| 852,334 | 10/1960 | Great Britain | 260—210 AB |

SAM ROSEN, Primary Examiner

U.S. Cl. X.R.

424—115, 120, 174, 252